(12) United States Patent
Asano et al.

(10) Patent No.: US 8,542,278 B2
(45) Date of Patent: Sep. 24, 2013

(54) SHAKING DETECTION DEVICE, SHAKING CORRECTION DEVICE, IMAGING DEVICE, AND SHAKING DETECTION METHOD

(75) Inventors: Tadashi Asano, Tokyo (JP); Ryuuichi Sawada, Tokyo (JP)

(73) Assignee: Kyocera Corporation, Kyoto (JP)

( * ) Notice: Subject to any disclaimer, the term of this patent is extended or adjusted under 35 U.S.C. 154(b) by 788 days.

(21) Appl. No.: 12/159,366

(22) PCT Filed: Dec. 25, 2006

(86) PCT No.: PCT/JP2006/325782
§ 371 (c)(1),
(2), (4) Date: Jul. 23, 2010

(87) PCT Pub. No.: WO2007/074774
PCT Pub. Date: Jul. 5, 2007

(65) Prior Publication Data
US 2010/0277602 A1    Nov. 4, 2010

(30) Foreign Application Priority Data

| Dec. 26, 2005 | (JP) | 2005-373578 |
| Apr. 5, 2006 | (JP) | 2006-104721 |
| Apr. 5, 2006 | (JP) | 2006-104722 |
| Jun. 28, 2006 | (JP) | 2006-178742 |
| Aug. 23, 2006 | (JP) | 2006-227048 |

(51) Int. Cl.
*H04N 5/228* (2006.01)
*G03B 17/00* (2006.01)
*G06K 9/00* (2006.01)

(52) U.S. Cl.
USPC ........ 348/208.1; 348/208.4; 396/52; 382/107

(58) Field of Classification Search
USPC .................. 348/208.1; 396/52–55
See application file for complete search history.

(56) References Cited

U.S. PATENT DOCUMENTS

| 5,731,832 A | * | 3/1998 | Ng | 348/155 |
| 6,343,100 B1 | * | 1/2002 | Fujiwara et al. | 375/240.17 |

(Continued)

FOREIGN PATENT DOCUMENTS

| JP | 05-007336 | 1/1993 |
| JP | 05-145828 | 6/1993 |

(Continued)

OTHER PUBLICATIONS

Chinese language office action and its English language translation for corresponding Chinese application 2006800534445.

(Continued)

*Primary Examiner* — Sinh Tran
*Assistant Examiner* — Christopher K Peterson
(74) *Attorney, Agent, or Firm* — DLA Piper LLP (US)

(57) ABSTRACT

A data thinning unit prepares thinned images by extracting only one component in raw data of each of a standard image and reference image, a block extracting unit extracts a search block and a template block for finding residual differences, a luminance difference comparing unit obtains a difference between the maximum value and the minimum value of luminance values of each block, and, when smaller than a threshold value, excludes this from a scope of acquisition of residual differences. The residual difference acquiring unit acquires residual differences from blocks which were not excluded, a block selecting unit selects a predetermined number of blocks having small residual differences, and a hand shake (blur or unintentional movement) acquiring unit finds a position of the template block at which the residual difference becomes the minimum, calculates a center value of all positions, and defines the same as the amount of hand shake.

11 Claims, 9 Drawing Sheets

(56) References Cited

U.S. PATENT DOCUMENTS

| | | | |
|---|---|---|---|
| 8,130,845 B2* | 3/2012 | Brusnitsyn et al. | 375/240.28 |
| 2006/0002471 A1* | 1/2006 | Lippincott et al. | 375/240.16 |
| 2006/0066728 A1* | 3/2006 | Batur | 348/208.99 |
| 2006/0159364 A1* | 7/2006 | Poon et al. | 382/275 |
| 2006/0233258 A1* | 10/2006 | Holcomb | 375/240.21 |
| 2007/0110157 A1* | 5/2007 | Jung | 375/240.16 |
| 2008/0107186 A1* | 5/2008 | Brusnitsyn et al. | 375/240.28 |

FOREIGN PATENT DOCUMENTS

| | | |
|---|---|---|
| JP | 06-169452 | 6/1994 |
| JP | 07-177519 | 7/1995 |
| JP | 10-108079 | 4/1998 |
| JP | 2001-061151 | 3/2001 |
| JP | 2003-032559 | 1/2003 |
| JP | 2003-065737 | 3/2003 |
| JP | 2003-134385 | 5/2003 |
| JP | 2003-134388 | 5/2003 |
| JP | 2003-143484 | 5/2003 |
| JP | 2003-348429 | 12/2003 |
| JP | 2004-127322 | 4/2004 |
| JP | 2004-279514 | 10/2004 |
| JP | 2005-149288 | 6/2005 |
| WO | WO 2004/062270 | 7/2004 |

OTHER PUBLICATIONS

Japanese language office action dated Mar. 13, 2012 and its English language translation for corresponding Japanese application 2006104721.

Japanese language office action dated Mar. 13, 2012 and its English language translation for corresponding Japanese application 2006227048.

Japanese language office action dated Mar. 13, 2012 and its English language translation for corresponding Japanese application 2006178742.

* cited by examiner

FIG. 2

| Gr | R |
|----|----|
| B | Gb |

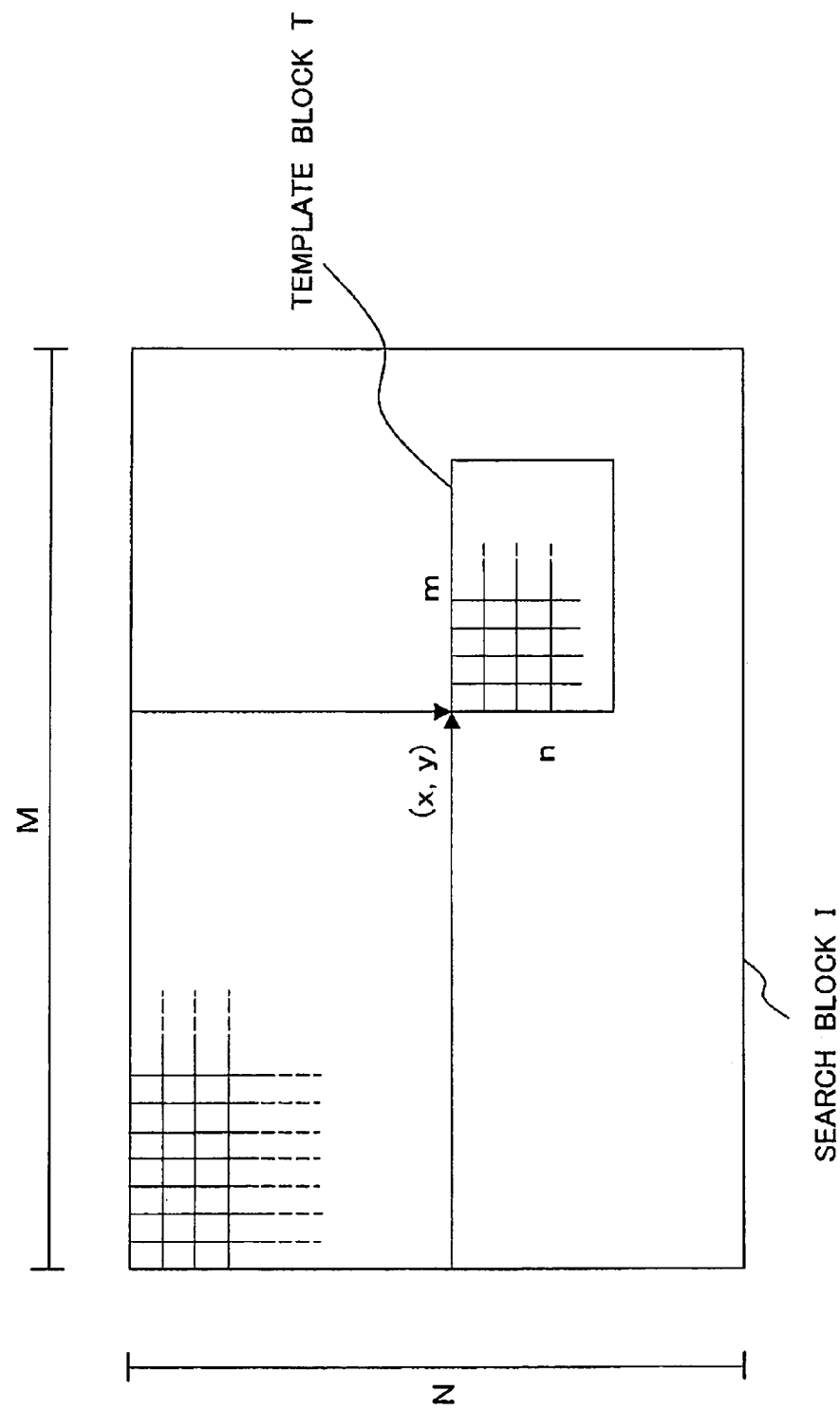

SHAKING DETECTION DEVICE, SHAKING CORRECTION DEVICE, IMAGING DEVICE, AND SHAKING DETECTION METHOD

CROSS-REFERENCE TO THE RELATED APPLICATIONS

This application is a national stage of international application No. PCT/JP2006/325782 filed Dec. 25, 2006, which also claims benefit of priority under 35 U.S.C. §119 to Japanese Patent Application No. 2005-373578 filed Dec. 26, 2005, Japanese Patent Application No. 2006-104721 filed Apr. 5, 2006, Japanese Patent Application No. 2006-104722 filed Apr. 5, 2006, Japanese Patent Application No. 2006-178742 filed Jun. 28, 2006 and Japanese Patent Application No. 2006-227048 filed Aug. 23, 2006, the entire contents of all of which are incorporated herein by reference.

TECHNICAL FIELD

The present invention relates to a shaking (blur or unintentional movement) detection device, a shaking correction device, an imaging device having a shaking correction device, and a shaking detection method for correcting shaking including correcting the "hand shake" phenomenon.

BACKGROUND ART

In recent years, imaging devices such as cameras have been made increasingly smaller in size. Attention is now being focused on technology for correcting the "hand shake (blur or unintentional movement)" phenomenon.

Due to the smaller sizes of cameras, the holdability drops at the time of taking a picture. Further, the degree of freedom is increased in comparison with conventional type of photography such as with the one-handed shooting in the method of taking a picture by a camera mounted in a mobile phone.

When taking a picture, when taking the picture by various methods or in a state with no stability in this way, the camera shakes (is unintentionally moved (is blurred)) when depressing the shutter button and hand shake occurs.

For example, in the case of taking a picture under dark conditions where the exposure time is long, the shutter speed becomes slow and the camera ends up shaking in many cases.

Further, in a case of taking a picture by raising the sensitivity under the exposure conditions to shorten the exposure time, noise ends up being superposed and the image becomes rough.

In order to solve this problem, devices correcting such hand shake are being mounted on single-lens reflex cameras and, recently, on compact cameras as well.

For example, an optical type hand shake correction device inclining the lens to match with the shaking for correcting the hand shake is being commercialized, but if considering the reduction in size in recent years and the mounting of such devices in mobile phone cameras, this would be very difficult in terms of space.

Further, as another method, various types of imaging devices able to obtain an image free from shaking by image processing from among a plurality of images are being proposed.

For example, Patent Document 1 (Japanese Patent Publication (A) No. 10-108079) discloses an imaging device which mixes captured image information differing in exposure conditions to obtain an image extended in dynamic range during which, when mixing captured image information of substantially the same time obtained by pixels differing in exposure conditions, using the captured image information of at least one of the exposure conditions overlappingly.

Patent Document 2 (Japanese Patent Publication (A) No. 2004-279514) discloses a correction device storing in advance a hand shake limit exposure time unique to the photographer based on detection information of an angle detection sensor provided in a camera and focal length information and aperture stop information of the camera and, when the suitable exposure time becomes longer than the hand shake limit exposure time, capturing images a plurality of times by a shorter exposure time and mixing the images to correct the hand shake.

Patent Document 3 (Japanese Patent Publication (A) No. 2003-32559) discloses an imaging device splitting light flux from a lens into two and attenuating one light flux to obtain two object images having a luminance difference at different regions on an imaging surface of an imaging element and making the charge storage times and charge storage start timings of these two image data equal to each other to thereby obtain new image data having an extended dynamic range.

Patent Document 4 (Japanese Patent Publication (A) No. 7-177519) discloses a movement vector detection method detecting a movement vector for each thinned block and performing interpolation from the detected movement vectors to thereby give a movement vector to any block not detected and performing detection for each block in a last movement vector detection.

Patent Document 5 (Japanese Patent Publication (A) No. 6-169452) discloses an image compression method evaluating an image and transmitting data with a high definition for a portion judged as important and transmitting data with a low definition for a portion which moves little or is stationary.

Patent Document 1: Japanese Patent Publication (A) No. 10-108079
Patent Document 2: Japanese Patent Publication (A) No. 2004-279514
Patent Document 3: Japanese Patent Publication (A) No. 2003-32559
Patent Document 4: Japanese Patent Publication (A) No. 7-177519
Patent Document 5: Japanese Patent Publication (A) No. 6-169452

DISCLOSURE OF THE INVENTION

Problem to be Solved by the Invention

In the hand shake correction method explained above, however, there is the disadvantage that a large number of capturing operations are required and the processing time ends up becoming longer in order to correct the positional deviation between images occurring between images captured.

Accordingly, in order to solve the disadvantage explained above, it has been demanded to provide a shaking (blur or unintentional movement) detection device, a shaking correction device, an imaging device, and a shaking detection method able to detect hand shake with a high precision with little processing.

Means for Solving the Problem

A shaking detection device of a first aspect of the invention is a shaking detection device performing matching processing and detecting an amount of shaking based on a standard image and a reference image differing in exposure conditions, having a macro block dividing unit configured to divide each of the standard image and reference image into a plurality of macro blocks, a block extracting unit configured to extract a first block including one or more macro blocks each having a predetermined size from the standard image divided by the macro block dividing unit and extract a second block including one or more macro blocks each having a predetermined size from macro blocks of the reference image divided by the macro block dividing unit, a residual difference acquiring unit configured to acquire residual differences between the first block and the second block extracted by the block extracting unit and acquire a residual difference integral value for each of the macro blocks based on the acquired residual differences, a block selecting unit configured to select a predetermined number of macro blocks having small residual difference integral values acquired by the residual difference acquiring unit, and a shaking acquiring unit configured to acquire residual differences again at the residual difference acquiring unit for the macro blocks selected by the block selecting unit and define, as the amount of shaking, a value at a predetermined place order when arranging the residual difference integral values in order from a largest value or from a smallest value.

A shaking detection device of a second aspect of the invention is a shaking detection device performing matching processing and detecting shaking correction of an imaging device based on a standard image and a reference image differing in exposure conditions, having a macro block dividing unit configured to divide each of the standard image and reference image into a plurality of macro blocks, a block extracting unit configured to extract a first block including one or more macro blocks each having a predetermined size from the standard image divided by the macro block dividing unit and extract a second block including one or more macro blocks each having a predetermined size from macro blocks of the reference images divided by the macro block dividing unit, a residual difference acquiring unit configured to acquire residual differences between the first block and the second block extracted by the block extracting unit and acquire a residual difference integral value for each of the macro blocks based on the acquired residual differences, a block selecting unit configured to select a predetermined number of macro blocks having small residual difference integral values acquired by the residual difference acquiring unit, and a shaking acquiring unit configured to acquire a movement vector for each of the selected blocks and define, as the amount of shaking, a movement vector at a predetermined place order when arranging the acquired movement vectors in a predetermined order.

A shaking correction device of a third aspect of the invention is a shaking correction device performing matching processing and detecting an amount of shaking based on a standard image and reference image differing in exposure conditions and correcting the shaking based on the amount of shaking, having a macro block dividing unit configured to divide each of the standard image and reference image into a plurality of macro blocks, a block extracting unit configured to extract a first block including one or more macro blocks each having a predetermined size from the standard image divided by the macro block dividing unit and extract a second block including one or more macro blocks each having a predetermined size from macro blocks of the reference image divided by the macro block dividing unit, a residual difference acquiring unit configured to acquire residual differences between the first block and the second block extracted by the block extracting unit and acquire a residual difference integral value for each of the macro blocks based on the acquired residual differences, a block selecting unit configured to select a predetermined number of macro blocks having small residual difference integral values acquired by the residual difference acquiring unit, a shaking acquiring unit configured to acquire residual differences again at the residual difference acquiring unit for the macro blocks selected by the block selecting unit and define, as the amount of shaking, a value at a predetermined place order when arranging the residual difference integral values in an order from the largest value or from the smallest value, and an image mixing unit configured to mix the plurality of images based on the amount of shaking found by the shaking calculating unit.

A shaking correction device of a fourth aspect of the invention is a shaking correction device performing matching processing and detecting an amount of shaking based on a standard image and reference image differing in exposure conditions and correcting the shaking based on the amount of shaking, having a macro block dividing unit configured to divide each of the standard image and reference image into a plurality of macro blocks, a block extracting unit configured to extract a first block including one or more macro blocks each having a predetermined size from the standard image divided by the macro block dividing unit and extract a second block including one or more macro blocks each having a predetermined size from macro blocks of the reference image divided by the macro block dividing unit, a residual difference acquiring unit configured to acquire residual differences between the first block and the second block extracted by the block extracting unit and acquire a residual difference integral value for each of the macro blocks based on the acquired residual differences, a block selecting unit configured to select a predetermined number of macro blocks having small residual difference integral values acquired by the residual difference acquiring unit, and a shaking acquiring unit configured to acquire a movement vector for each of the selected blocks and define, as the amount of shaking, the movement vector at a predetermined place order when arranging the acquired movement vectors in a predetermined order.

An imaging device of a fifth aspect of the invention is an imaging device capturing object images, wherein the device has a shaking detection device configured to perform matching processing and detect an amount of shaking based on a standard image and reference image differing in exposure conditions, the shaking detection device being a shaking detection device performing matching processing and detecting shaking correction of the imaging device based on the standard image and reference images differing in exposure conditions and having a macro block dividing unit configured to divide each of the standard image and reference image into a plurality of macro blocks, a block extracting unit configured to extract a first block including one or more macro blocks each having a predetermined size from the standard image divided by the macro block dividing unit and extract a second block including one or more macro blocks each having a predetermined size from macro blocks of the reference image divided by the macro block dividing unit, a residual difference acquiring unit configured to acquire residual differences between the first block and the second block extracted by the block extracting unit and acquire a residual difference integral value for each of the macro blocks based on the acquired residual differences, a block selecting unit configured to select a predetermined number of macro blocks having small residual difference integral values acquired by the residual difference acquiring unit, and a shaking acquiring unit configured to acquire residual differences again at the residual difference acquiring unit for the macro blocks selected by the block selecting unit and define, as the amount of shaking, a value at a predetermined place order when arranging residual difference integral values in order from the largest value or from the smallest value.

An imaging device of a sixth aspect of the invention is an imaging device capturing object images, wherein the device has a shaking detection device configured to perform matching processing and detect an amount of shaking based on a standard image and reference image differing in exposure conditions, the shaking detection device being a shaking detection device performing the matching processing and detecting the shaking correction of the imaging device based on the standard image and reference images differing in exposure conditions and having a macro block dividing unit configured to divide each of the standard image and reference image into a plurality of macro blocks, a block extracting unit configured to extract a first block including one or more macro blocks each having a predetermined size from the standard image divided by the macro block dividing unit and extract a second block including one or more macro blocks each having a predetermined size from macro blocks of the reference image divided by the macro block dividing unit, a residual difference acquiring unit configured to acquire residual differences between the first block and the second block extracted by the block extracting unit and acquire a residual difference integral value for each of the macro blocks based on the acquired residual differences, a block selecting unit configured to select a predetermined number of macro blocks having small residual difference integral values acquired by the residual difference acquiring unit, and a shaking acquiring unit configured to acquire a movement vector for each of the selected blocks and define, as the amount of shaking, a movement vector at a predetermined place order when arranging the acquired movement vectors in a predetermined order.

A shaking detection method of a seventh aspect of the invention is a shaking detection method for performing matching processing and detecting an amount of shaking based on a standard image and a reference image differing in exposure conditions, having a first step of dividing each of the standard image and reference image into a plurality of macro blocks, a second step of extracting a first block including one or more macro blocks each having a predetermined size from the standard image divided at the first step and extracting a second block including one or more macro blocks each having a predetermined size from macro blocks of the reference image divided at the first step, a third step of acquiring a residual difference between the first block and the second block extracted in the second step and acquiring a residual difference integral value for each of the macro blocks based on the acquired residual differences, a fourth step of selecting a predetermined number of macro blocks having small residual difference integral values acquired at the third step, and a fifth step of acquiring residual differences again for the macro blocks selected at the fourth step and defining, as the amount of shaking, a value at a predetermined place order when arranging residual difference integral values in order from the largest value or from the smallest value.

A shaking detection method of an eighth aspect of the invention is a shaking detection method for performing matching processing and detecting the amount of shaking based on a standard image and a reference image differing in exposure conditions, having a sixth step of dividing each of the standard image and reference image into a plurality of macro blocks, a seventh step of extracting a first block including one or more macro blocks each having a predetermined size from the standard image divided at the sixth step and extracting a second block including one or more macro blocks each having a predetermined size from macro blocks of the reference image divided at the sixth step, an eighth step of acquiring a residual difference between the first block and the second block extracted at the seventh step and acquiring a residual difference integral value for each of the macro blocks based on the acquired residual differences, a ninth step of selecting a predetermined number of macro blocks having small residual difference integral values acquired at the eighth step, and a 10th step of acquiring a movement vector for each of blocks selected in the ninth step and defining, as the amount of shaking, the movement vector at a predetermined place order when arranging the acquired movement vectors in a predetermined order.

BRIEF DESCRIPTION OF THE DRAWINGS

FIG. 2 is a diagram showing an example of the structure of raw image data.
FIG. 3 is a diagram for explaining a method for sequentially detecting residual differences.

DESCRIPTION OF NOTATIONS

1 . . . imaging device, 2 . . . camera, 3 . . . hand shake detecting unit, 4 . . . image mixing unit, 5 . . . buffer memory, 31 . . . data thinning unit, 32 . . . macro block dividing unit, 33 . . . block extracting unit 34 . . . luminance difference comparing unit, 3 . . . residual difference acquiring unit, 36 . . . block selecting unit, and 37 . . . hand shake acquiring unit.

BEST MODE FOR CARRYING OUT THE INVENTION

Below, an imaging device of an embodiment of the present invention will be explained.

Below, a case where hand shake (blur or unintentional movement) correction is carried out will be explained as an embodiment of the present invention. However, the "shaking correction" of the present invention is not limited to the correction of hand shake. The correction can be carried out also with respect to shaking (blur) caused by a factor other than the hand, for example, a case where the shaking (blur) is corrected when an imaging device is mounted in a vehicle etc. Further, in this present processing, high precision shaking detection can be carried out with a small amount of processing.

First Embodiment

Figure 1:
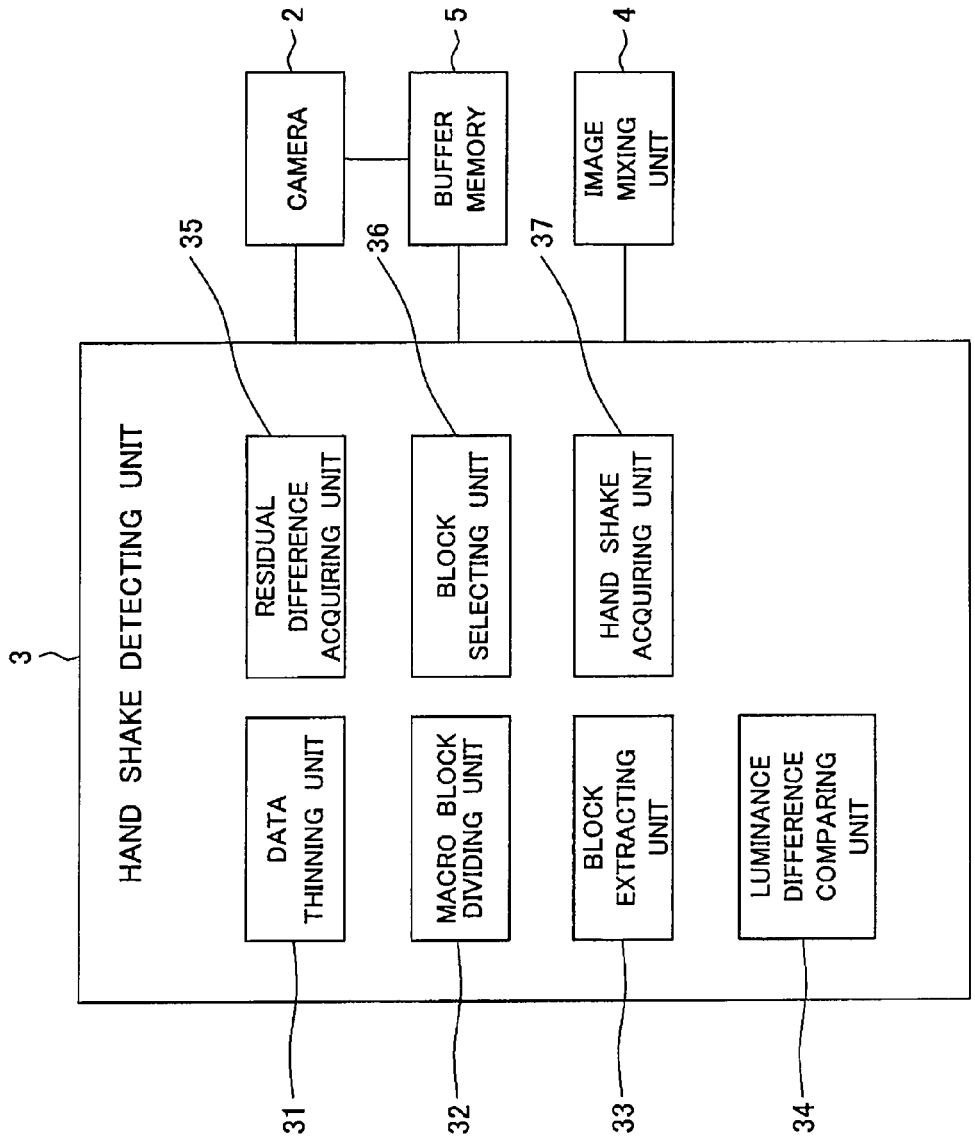
FIG. 1 is a block diagram showing the configuration of an imaging device of a first embodiment.

FIG. 1 is a block diagram showing the configuration of an imaging device 1 of the first embodiment.

As shown in FIG. 1, the imaging device 1 of the first embodiment has a camera 2, a hand shake detecting unit 3, an image mixing unit 4, and a buffer memory 5.

The camera 2 is a digital camera module comprised a lens and a CCD (charged coupled device) or CMOS (complementary metal oxide semiconductor) or other imaging element. It converts light passing through the lens photoelectrically by the imaging element, acquires color information by a color filter, and outputs the same as image data (raw data). The camera 2, when correcting hand shake at the time of capturing an image, captures a plurality of images taken successively under different exposure conditions. For the hand shake detection, one of these plurality of images is defined as a standard image, and the remaining other images are used as reference images. Note that the standard image and the reference images differ in the exposure conditions. The images captured by the camera 2 are temporarily stored in the buffer memory 5 for the hand shake correction processing.

The hand shake detecting unit 3 detects the amount of hand shake of the image based on the standard image and reference images captured by the camera 2 and stored in the buffer memory 5.

The hand shake detecting unit 3, as configurations for the hand shake detection, further has a data thinning unit 31, a macro block dividing unit 32, a block extracting unit 33, a luminance difference comparing unit 34, a residual difference acquiring unit 35, a block selecting unit 36, and a hand shake acquiring unit 37.

The data thinning unit 31 thins the data of the raw data of the standard image and reference images captured by the camera 2 to prepare a thinned standard image and thinned reference images used for detection of the movement amount.

Figure 2:
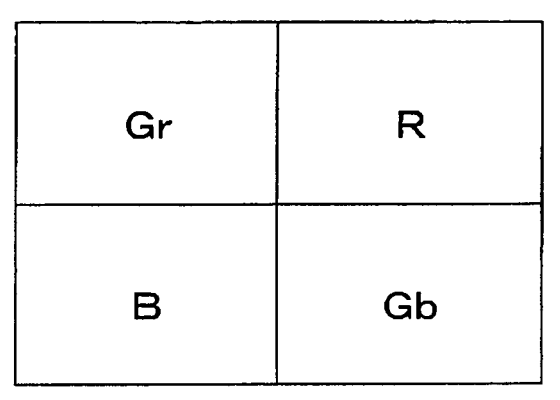

The raw data is the data of the signal obtained from the imaging element of the camera 2 as it is. For example, the raw data captured by a camera having a primary color filter is, as shown in FIG. 2, comprised of four types of color data of Gr (first green), R (red), B (blue), and Gb (second green).

The data thinning unit 31 uses the raw data of each of the standard image and reference images captured by the camera 2 to extract only the header green data (Gr) among these four types of color data and prepare the thinned image of each. Note that, in the present embodiment, only Gr is extracted, but the present invention is not limited to this. Any one of R, B, and Gb may be extracted as well.

The macro block dividing unit 32 divides each of the thinned images of the standard image and reference images prepared by thinning parts of the raw data by the data thinning unit 31 into a plurality of macro blocks. In the present embodiment, the macro block dividing unit 33 divides each image into for example 10×10 macro blocks.

The macro block extracting unit 33 and residual difference acquiring unit 35 uses the sequential similarity detection algorithm (SSDA) method to find a sum of absolute values of the differences of pixel values between a block in the standard image and a corresponding block in a reference image (residual difference) and performs template matching.

"Template matching" is a technique of finding a degree of similarity and a degree of difference between a searched pattern (search block I) and a template (template block T) prepared in advance. The residual difference sequential detection method is one such technique.

The "residual difference sequential detection method" is, as shown in FIG. 3, a method of comparison of a search block I comprised of M×N pixels from the standard image by extracting a template block T comprised of m×n pixels from the reference image and moving the template block T over the search block I to find a position on the search block I matching the template block T. Note that when M>m and N>n and the coordinates of the top left template block T are (x, y), the cumulative residual difference E(x,y) of the residual differences, that is, the differences of the pixel values between the search block I and the template block T, that is, the residual difference integral value E(x,y) obtained by adding all pixels in the macro block for each macro block based on the residual difference, is a function of (x,y) and is given by Equation (1):

$$E(x, y) = \sum_{m=0}^{m-1} \sum_{n=0}^{n-1} I(x+m, b+n) - T(m, n) \qquad \text{[Equation 1]}$$

The position of (x,y) at which the residual difference integral value E(x,y) becomes the minimum is the position at which the template block T and the search block I coincide.

Figure 4B:
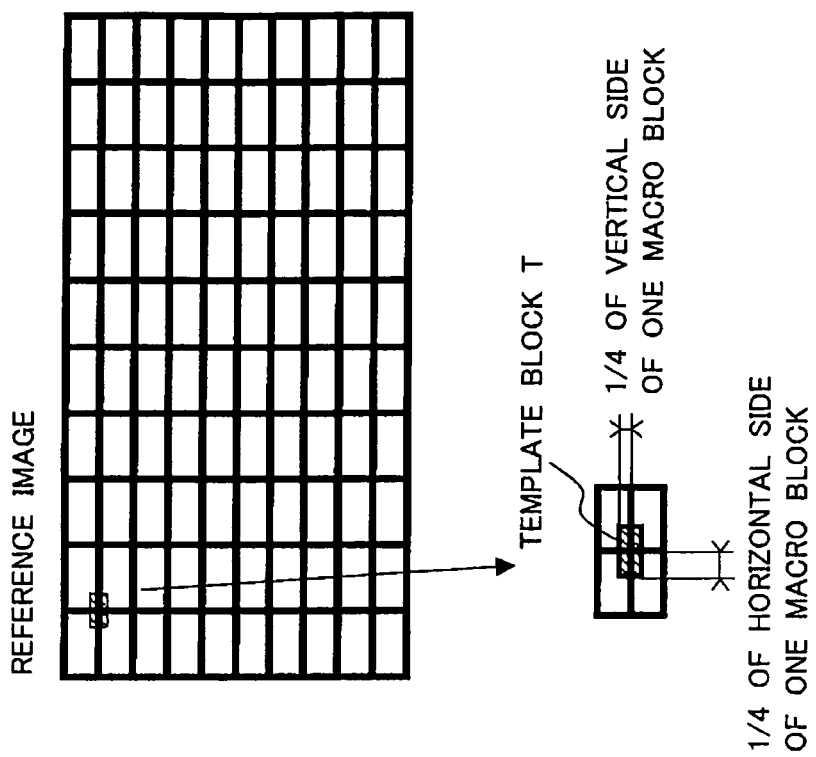
FIG. 4 is a diagram showing a concrete example of block extraction of a block extracting unit in the present embodiment.
Figure 4A:
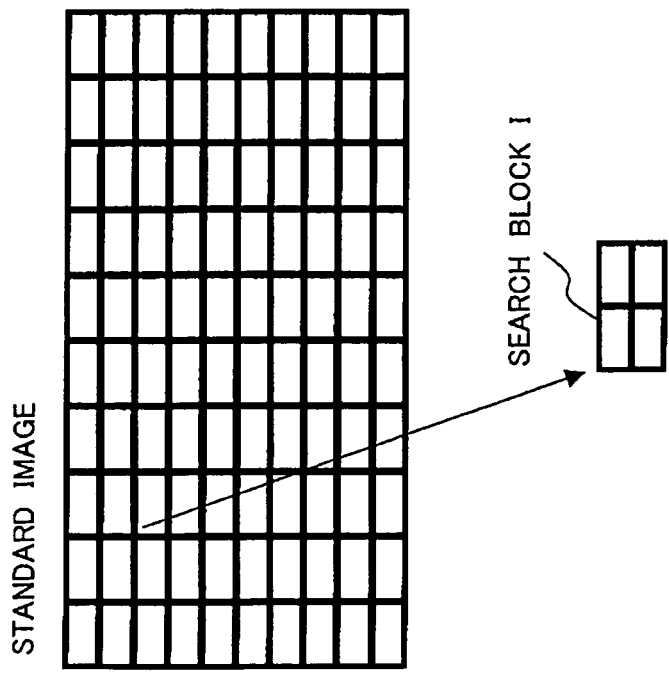

In the present embodiment, the block extracting unit 33, as shown in FIG. 4A, extracts a search block I comprised of 2×2=4 blocks from among the 10×10 macro blocks of the standard image. Further, the block extracting unit 33 extracts a template block T shown in FIG. 4B located at a center portion of the 2×2 blocks of the corresponding reference image and comprised of four blocks each being comprised of two sides having lengths of ¼ of the vertical and horizontal two sides of a macro block.

Next, the residual difference acquiring unit 35 uses the search block I and template block T extracted by the block extracting unit 33 to acquire residual differences by the residual difference sequential detection method explained above.

Note that, with the residual difference sequential detection method, if the value of E(x,y) exceeds a predetermined threshold value A while cumulatively adding the differences of pixel values in order to calculate E(x,y), this means the search block I and template block T do not match at all, so at that point of time, the processing for calculation of the residual difference integral value E(x,y) for that position (x,y) is stopped and calculation of the residual difference with respect to another position (x,y) is shifted to. Due to this, the template matching according to the residual difference sequential detection method enables shortening of the processing time and reduction of the amount of processing. The magnitude of the predetermined threshold value A is not limited in the present invention.

Further, in the present embodiment, the luminance difference comparing unit 34 obtains the difference between the maximum value and the minimum value of luminance values for each macro block during the period from when the block extracting unit 33 extracts a search block I and template block T to when the residual difference acquiring unit 35 acquires the residual differences. When this difference is smaller than a predetermined threshold value B, it performs processing to exclude that macro block from the scope of acquisition of the residual differences by the residual difference acquiring unit 35. Note that the threshold value B may be a predetermined ratio of the difference between the maximum value and the minimum value of luminance values of all pixels of the standard image or all pixels of the reference images or a predetermined ratio of a mean value of differences between the maximum value and the minimum value of luminance values of all pixels of the standard image and reference images.

Namely, a block having a small difference between the maximum value and the minimum value of luminance values is for example a pure white part or other block having a low contrast. The amount of hand shake is hard to detect in such a block, therefore this is excluded from the processing for detection of the movement amount.

Note that the magnitude of the predetermined threshold value B is not limited in the present invention.

When the luminance difference comparing unit 34 obtains the difference between the maximum value and the minimum value of the luminance values for a macro block and this difference is smaller than the predetermined threshold value B, the block selecting unit 36 excludes that macro block from the scope of acquisition of the residual differences by the residual difference acquiring unit 35, compares minimum values of the residual difference integral values E(x,y) in all search blocks I acquired by the residual difference acquiring unit 35, then extracts only a predetermined number of small search blocks I having residual difference integral values having small minimum values. Alternatively, it may also extract a predetermined ratio of the blocks of the total number of blocks instead of extracting a predetermined number of blocks.

In the present embodiment, for example, the unit extracts 10 blocks.

The hand shake acquiring unit 37 finds the integral values E(x,y) without thinning in macro blocks selected by the block selecting unit 36 in the search blocks I, calculates the center value when arranging macro blocks in order from the largest or smallest macro block, and defines this value as the amount of hand shake of this image. Note that, in the present embodiment, the center value was used, but the present invention is not limited to this. It need only be one at a predetermined place order.

The hand shake detecting unit 3 detects the amount of hand shake by the method explained above.

The image mixing unit 4 mixes the standard image and reference images captured by the camera 2 (not thinned) and prepares a corrected image corrected for hand shake based on the amount of hand shake detected by the hand shake detecting unit 3.

The buffer memory 5 is a RAM (random access memory) temporarily storing image data before correction used for the hand shake correction processing.

Below, an example of the operation at the time the imaging device 1 of the present embodiment captures an image will be explained.

Figure 5:
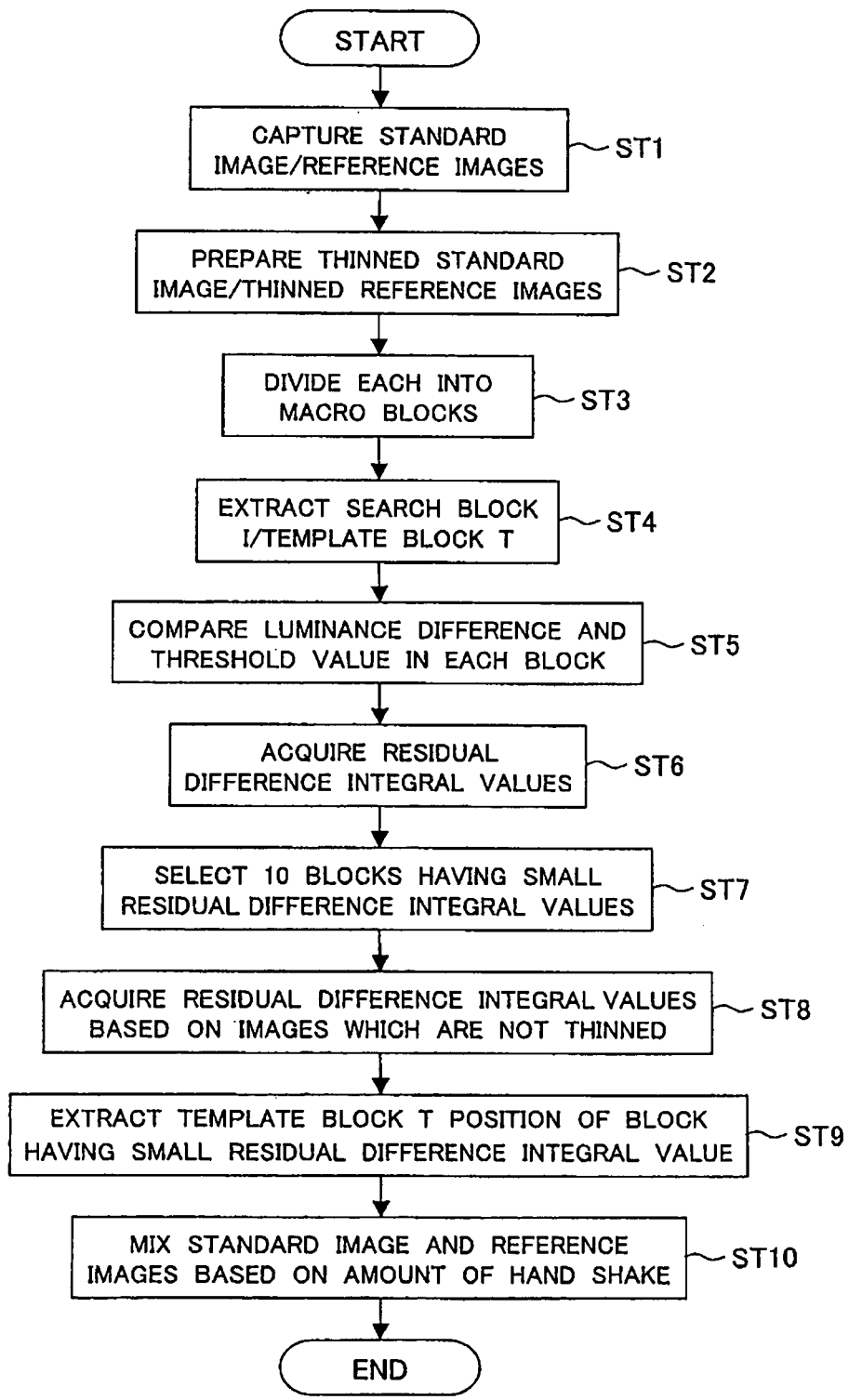
FIG. 5 is a flow chart showing an example of the operation at the time of the imaging device of the present embodiment capturing an image.

FIG. 5 is a flow chart showing an example of the operation of the imaging device 1.

Step ST1:
The camera 2 captures one standard image and one or more reference images by changing the exposure conditions.

Step ST2:
The data thinning unit 31 extracts only the Gr (green) components among the data of the raw data of the standard image and reference images captured by the camera 2 at step ST1 and thins out the other components to prepare a thinned standard image and thinned reference images.

Step ST3:
The macro block dividing unit 32 divides the thinned standard image and thinned reference images prepared by the data thinning unit 31 at step ST2 into 10×10 macro blocks.

Step ST4:
The block extracting unit 33 extracts from the thinned standard image and the thinned reference images, each of which was divided into 10×10 macro blocks by the macro block dividing unit 32 at step ST3, a search block I of 2×2=4 blocks from among the 10×10 macro blocks of the thinned standard image as shown in FIG. 4A and extracts from the thinned reference image as shown in FIG. 4B the template block T located at a center portion of the corresponding 2×2 blocks and comprised of four blocks each being comprised of two sides having lengths of ¼ of the vertical and horizontal two sides of a macro block.

Step ST5:
The luminance difference comparing unit 34 obtains a difference between the maximum value and the minimum value of the luminance values of the pixels and, when this difference is smaller than the predetermined threshold value B, excludes that macro block from the scope of acquisition of the residual differences by the residual difference acquiring unit 35.

Step ST6:
The residual difference acquiring unit 35 uses the search blocks I which were not excluded by the luminance difference comparing unit 34 at step ST5 and the template block T to acquire the residual differences by the residual difference sequential detection method explained above.

Step ST7:
The block selecting unit 36 selects 10 macro blocks having small residual difference integral values E(x,y) in all search blocks I acquired by the residual difference acquiring unit 35.

Step ST8:
The residual difference acquiring unit 35 reads out the standard image and reference images from which the raw data is not thinned from the buffer memory 5 and calculates the residual difference integral values again based on the data which are not thinned for the macro blocks selected by the block selecting unit at step ST7. The processing of the residual difference acquiring unit 35 at this step is performed in order to raise the precision of the overall hand shake detection processing of the hand shake detecting unit 3.

Step ST9:
The hand shake acquiring unit 37 finds the position of the template block T at which the residual difference becomes the minimum value in a search block I based on the residual difference integral value for the data not thinned acquired by the residual difference acquiring unit 35 at step ST8, finds integral values E(x,y) without thinning in the macro blocks selected by the block selecting unit 36, extracts the center value when arranging these in order from the largest or smallest one, and defines the same as the amount of hand shake.

Step ST10:
The image mixing unit 4 mixes the standard image and reference images captured by the camera 2 (not thinned) and prepares the corrected image corrected for hand shake based on the amount of hand shake acquired by the hand shake acquiring unit 37 at step ST9.

As explained above, according to the imaging device 1 of the present embodiment, when detecting the amount of hand shake, the block selecting unit 36 selects small blocks having small residual difference integral values by exactly the predetermined number or ratio, finds the position of the template image at which the residual difference integral value becomes the minimum based on the predetermined number of blocks, and detects the amount of hand shake based on that, therefore the amount of processing of the entire hand shake detection processing can be kept small, and the time taken for the processing can be kept short as well.

Further, according to the imaging device 1 of the present embodiment, the data thinning unit 31 extracts only the Gr (green) components among the data of the raw data of the standard image and reference images, thins the other components to prepare the thinned standard image and thinned reference images, and uses the thinned images in the post-processing, therefore the amount of processing of the entire hand shake detection processing can be kept small, and the time taken for the processing can be kept short as well. Further, the residual difference acquiring unit 35 acquires the residual difference integral values based on the thinned images, then acquires the residual difference integral values again based on the images which are not thinned, therefore hand shake detection processing with a high precision can be carried out.

Further, according to the imaging device 1 of the present embodiment, the luminance difference comparing unit 34 obtains the difference between the maximum value and the minimum value of luminance values for each macro block during the period from when the block extracting unit 33 extracts a search block T and template block T to when the residual difference acquiring unit 35 acquires the residual difference integral value and, when this value is smaller than a predetermined threshold value B, excludes that macro block from the scope of acquisition of the residual differences by the residual difference acquiring unit 35, therefore a block having a low contrast from which the residual difference is predicted to be unable to be obtained is excluded from the processing for acquiring the residual difference integral values by the residual difference acquiring unit 35, so the amount of processing of the overall hand shake detection processing can be kept small, and the time taken for the processing can be kept short as well.

Further, according to the imaging device 1 of the present embodiment, the pattern matching is carried out by the residual difference sequential detection method which stops the calculation of the residual differences at a point of time when the cumulative value exceeds a predetermined value when calculating the residual difference integral values, therefore the amount of processing of the overall hand shake detection processing can be kept small, and the time taken for the processing can be kept short as well.

Second Embodiment

A second embodiment of the imaging device is the same as the imaging device 1 of the first embodiment except that the data thinning unit 31 prepares ⅛ thinned images and ½ thinned images, the residual difference acquiring unit 35 first finds residual difference integral values (coarse search) by using the ⅛ thinned images, then extracts a predetermined number of blocks having small residual difference integral values and finds residual difference integral values again (fine search) for the ½ thinned images in those blocks.

Below, the configurations different from those of the imaging device 1 of the first embodiment will be explained.

The data thinning unit 31 thins the raw data of the standard image and the reference images captured by the camera 2 to ½ or ⅛ to prepare thinned images. A ½ thinned image is a thinned image prepared by extracting only one pixel per every two pixels among the pixels in the vertical and horizontal directions, while a ⅛ thinned image is a thinned image prepared by extracting only one pixel per every eight pixels among the pixels in the vertical and horizontal directions.

The method of thinning is not limited in the present invention. For example, the method of ½ thinning includes a method of extracting only the header green data (Gr) among four types of color data based on the raw data of each of the standard image and reference images captured by the camera 2. Further, only Gr is extracted in the present embodiment, but the present invention is not limited to this. Any one of R, B, and Gb may be extracted as well. Further, raw data which is not thinned may be used as well in place of the ½ thinned image.

The residual difference acquiring unit 35 first uses a search block I and the template block T of the ⅛ thinned image to acquire the residual differences by the above residual difference sequential detection method (coarse search). The search block I and the template block T at the time of the acquisition of residual differences are shown in FIG. 6.

Figure 6:
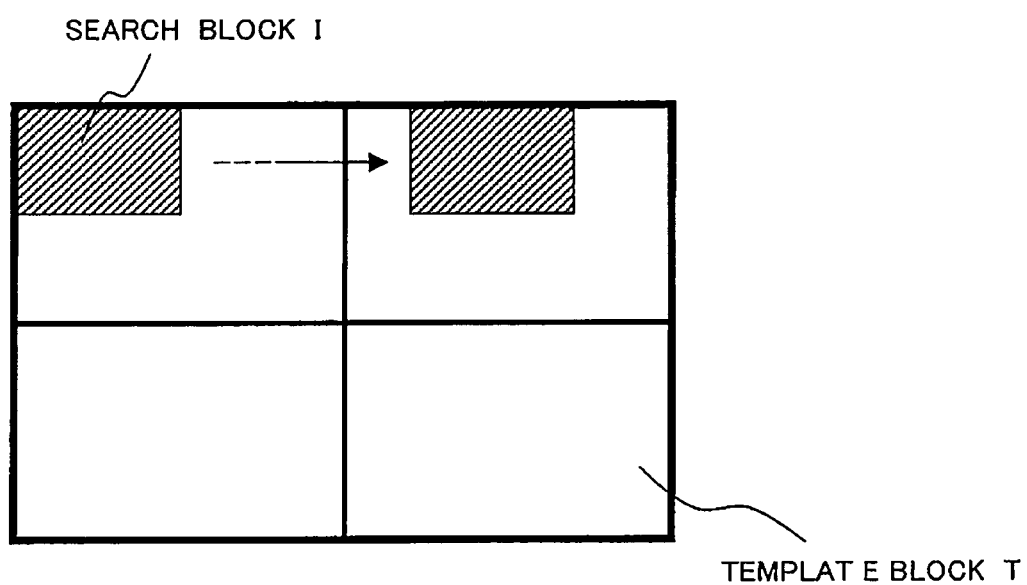
FIG. 6 is a diagram showing a situation of a template block T searching through a search block I.

FIG. 6 is a diagram showing a situation where the search block I is searched through by the template block T. As shown in FIG. 6, the template block T searches through the search block while moving by one pixel at a time.

When the luminance difference comparing unit 34 obtains a difference between the maximum value and the minimum value of luminance values for each macro block and that difference is smaller than the predetermined threshold value B, the block selecting unit 36 excludes that macro block from the scope of acquisition of residual differences by the residual difference acquiring unit 35, compares minimum values of residual difference integral values $E(x,y)$ in all search blocks I acquired by the residual difference acquiring unit 35, then extracts small search blocks I having residual difference integral values having a small minimum value in exactly the predetermined number. Alternatively, it may extract a predetermined ratio of blocks of the total number of blocks instead of extracting a predetermined number of blocks.

In the present embodiment, for example the unit extracts nine blocks.

Next, the residual difference acquiring unit 35 finds the integral values $E(x,y)$ in the ½ thinned image for the nine macro blocks selected by the block selecting unit 36 in the search block I (fine search).

When finding the residual difference integral values of the ½ thinned image, it is sufficient to calculate the residual difference integral values for only the pixels in the vicinity of pixels having a small integral value found for the ⅛ thinned image by the block extracting unit 33, residual difference acquiring unit 35, and block selecting unit 36 explained above, therefore the amount of calculation of the hand shake acquiring unit becomes much smaller in comparison with the conventional case.

Here, the relationship between a ⅛ thinned image and a ½ thinned image will be explained with reference to FIG. 7.

Figure 7:
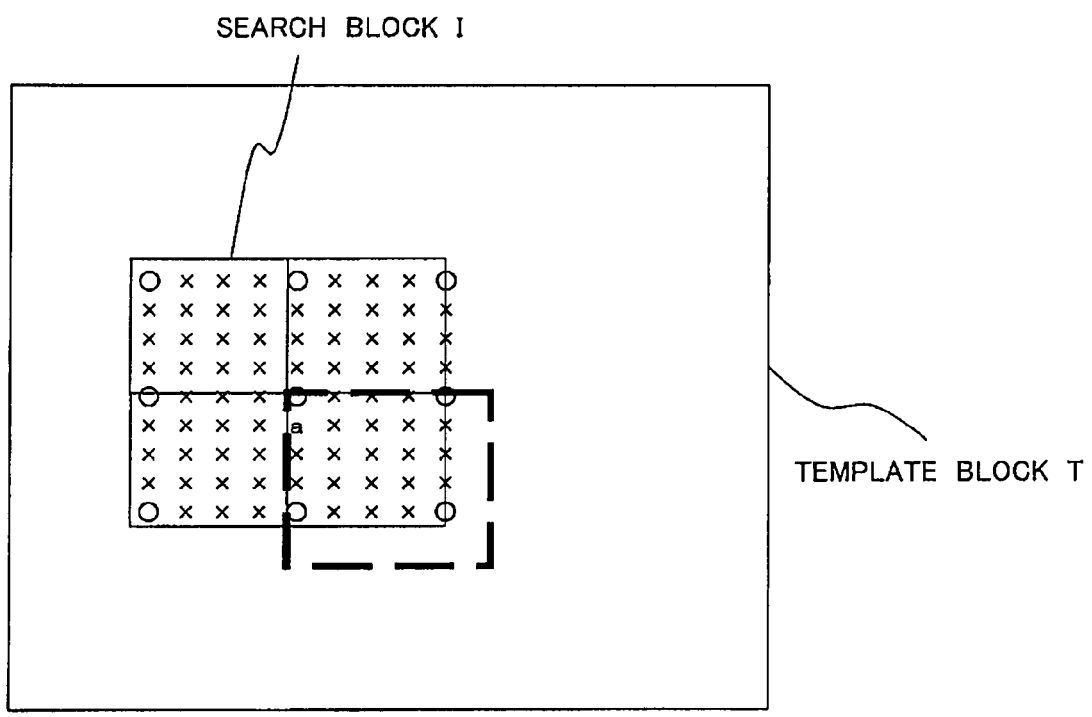
FIG. 7 is a diagram showing a range where there is a pixel having the smallest residual difference integral value in a ⅛ thinned image and a ½ thinned image.

Marks o shown in FIG. 7 represent pixels for which the residual difference integral value is calculated in the ⅛ thinned image, while marks x shown in FIG. 7 represent pixels for which the residual difference integral value is calculated in the ½ thinned image. It is seen that there is one pixel for which the residual difference integral value is to be calculated in the ⅛ thinned image for each four pixels in the vertical and horizontal directions for which the residual difference integral value is to be calculated in the ½ thinned image.

Namely, in the ⅛ thinned image, if the pixel of a in FIG. 7 is the pixel at which the residual difference integral value becomes the minimum in that block, it is seen that the pixel at which the residual difference integral value becomes the minimum exists within a range surrounded by a dotted line in FIG. 7 in the ½ thinned image.

The hand shake acquiring unit 37 calculates the center value when arranging the residual difference integral values $E(x,y)$ in the ½ thinned image found as described above in order from the smallest residual difference integral value and defines this as the amount of hand shake of this image. The center value was employed in the present embodiment, but the present invention is not limited to this. The value at any predetermined place order may be employed.

The hand shake detecting unit 3 detects the amount of hand shake by the method explained above.

Next, an example of the operation of the imaging device 1 of the present embodiment will be explained.

Figure 8:
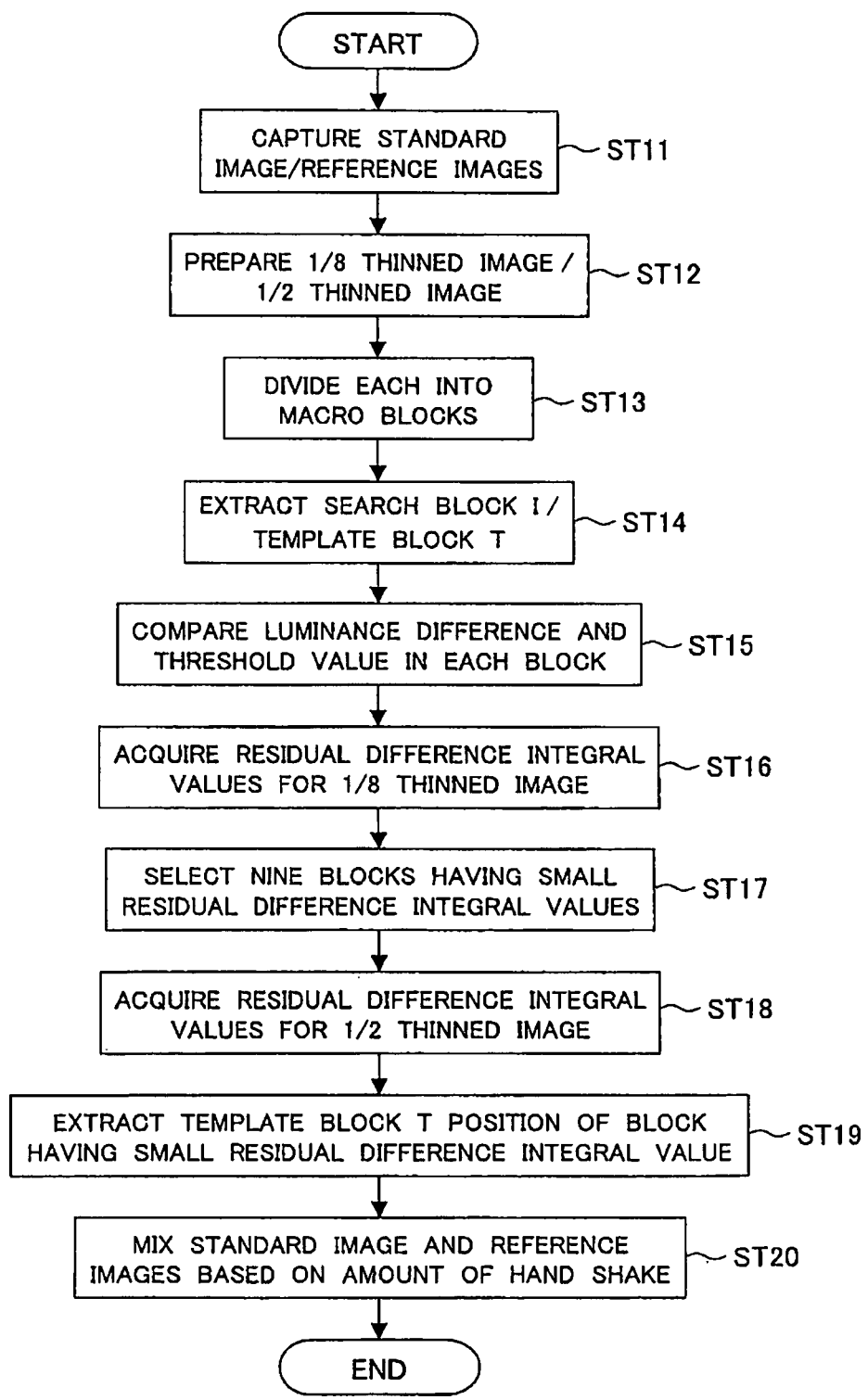
FIG. 8 is a flow chart showing an example of the operation at the time of an imaging device of a second embodiment capturing an image.

FIG. 8 is a flow chart showing an example of the operation of the imaging device 1 of the second embodiment.

Step ST11:

The camera 2 captures one standard image and one or more reference images while changing the exposure conditions.

Step ST12:

The data thinning unit 31 prepares ⅛ thinned images and ½ thinned images from the raw data of the standard image and reference images captured by the camera 2 at step ST11.

Step ST13:

The macro block dividing unit 32 divides the ⅛ thinned images of the standard image and reference images prepared by the data thinning unit 31 at step ST12 into for example 10×10 macro blocks.

Step ST14:

The block extracting unit 33 extracts a search block I from among the ⅛ thinned images of the standard image and reference images divided into 10×10 macro blocks by the macro block dividing unit 32 at step ST13 and extracts the template block T from the reference images.

Step ST15:

The luminance comparing unit 34 obtains a difference between the maximum value and the minimum value of the luminance values of the pixels and, when this difference is smaller than a predetermined threshold value B, excludes that macro block from the scope of acquisition of residual differences by the residual difference acquiring unit 35.

Step ST16:

The residual difference acquiring unit 35 uses the search blocks I not excluded by the luminance difference comparing unit 34 at step ST15 and the template block T to acquire the residual differences according to the residual difference sequential detection method explained above.

Step ST17:

The block selecting unit 36 selects nine macro blocks having small residual difference integral values E(x,y) in all of the search blocks I acquired by the residual difference acquiring unit 35.

Step ST18:

The residual difference acquiring unit 35 calculates the residual difference integral values again for the macro blocks selected by the block selecting unit at step ST17 for the ½ thinned images of the standard image and reference images.

The processing of the residual difference acquiring unit 35 in this step is performed in order to raise the precision of the overall hand shake detection processing of the hand shake detecting unit 3.

Step ST19:

The hand shake acquiring unit 37 finds the position of the template block T at which the residual difference becomes the minimum value in a search block I based on the residual difference integral values for the ½ thinned images acquired by the residual difference acquiring unit 35 at step ST18, finds the residual difference integral values E(x,y) of the ½ thinned images in the macro blocks selected by the block selecting unit 36, extracts the center value when arranging these in order from the smallest value, and defines the same as the amount of hand shake.

Step ST20:

The image mixing unit 4 mixes the standard image and reference images captured by the camera 2 (not thinned) and prepares the corrected image corrected for hand shake based on the amount of hand shake acquired by the hand shake acquiring unit 37 at step ST19.

As explained above, according to the imaging device 1 of the second embodiment, the luminance difference comparing unit 34 obtains the difference between the maximum value and the minimum value of luminance values for each macro block during the period from when the block extracting unit 33 extracts a search block T and template block T to when the residual difference acquiring unit 35 acquires the residual difference integral values and, when this value is smaller than a predetermined threshold value B, excludes that macro block from the scope of acquisition of the residual differences by the residual difference acquiring unit 35, therefore a block having a low contrast from which the residual difference is predicted to be unable to be obtained is excluded from the processing for acquiring the residual difference integral values by the residual difference acquiring unit 35, so the amount of processing of the overall hand shake detection processing can be kept small, and the time taken for the processing can be kept short as well.

Note that, in the same way as the first embodiment, the block selecting unit 35 may select small blocks having small residual difference integral values in exactly the predetermined number or in exactly a predetermined ratio when detecting the amount of hand shake. Further, the hand shake acquiring unit 37 defined the center value as the amount of hand shake in the present embodiment, but the present invention is not limited to this. It may also define one at any predetermined place order as the amount of hand shake.

Third Embodiment

A third embodiment of the imaging device 1 is the same as the second embodiment except for calculating only the residual differences within a predetermined range at the time of the residual difference acquiring unit 35 calculating residual differences for selecting blocks having small residual difference integral values.

Namely, when using ⅛ thinned images to find residual difference integral values (coarse search), the residual difference acquiring unit 35 does not calculate the residual difference integral values for pixels in the entire range, but performs the calculation of residual differences for pixels of only a predetermined range.

The predetermined range in which residual differences are calculated at the time of a coarse search by the residual difference acquiring unit 35 of the third embodiment will be explained with reference to FIG. 9.

Figure 9:
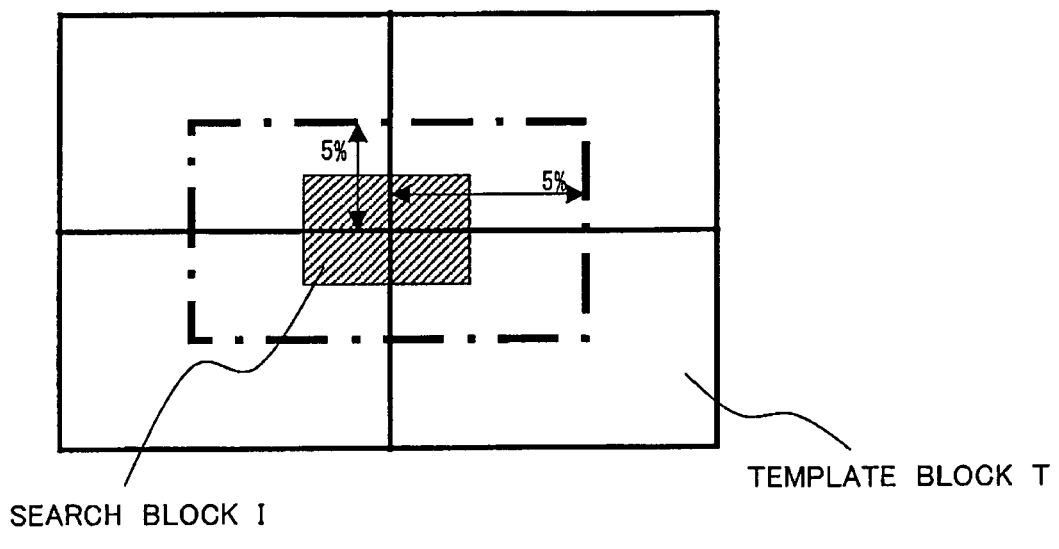
FIG. 9 is a diagram for explaining a predetermined range of calculation of the residual difference at the time of a coarse search by a residual difference acquiring unit of a third embodiment.

As shown in FIG. 9, the residual difference acquiring unit 35 calculates the residual differences for only a range covering for example pixels of 5% of the image thinned to ⅛. Namely, if the image is comprised of 3 mega-pixels (2048 pixels×1536 pixels), it calculates the residual differences for only 2048/5/20=about 13 (pixels) in the horizontal direction and calculates the residual differences for only 1535/8/20=about 10 (pixels) in the vertical direction. Accordingly, the time required for calculation of the residual differences is much shortened.

Note that the value of 5% is one example. The present invention is not limited to this. The value of 5% is the value derived from experience as the required lowest limit value in order to detect hand shake.

As explained above, when using a ⅛ thinned image to find the residual difference integral values (coarse search), the residual difference acquiring unit 35 of the third embodiment does not calculate the residual difference integral values for the pixels in the entire range, but calculates the residual differences for only pixels within a predetermined range, therefore the time required for the calculation of the residual difference is greatly shortened, and the time required for correction of hand shake can be kept small as well.

Fourth Embodiment

A fourth embodiment of the imaging device 1 is the same as the second embodiment except for, when the hand shake acquiring unit 37 acquires the amount of hand shake, detecting movement vectors of blocks selected by the block selecting unit 36 based on residual difference integral values E(x,y) in the ½ thinned images found by the residual difference acquiring unit 35 and defining as the amount of hand shake the movement vector having as a component the value at a predetermined place order when rearranging components of the movement vectors based on their magnitude.

Below, this will be concretely explained.

The hand shake acquiring unit 37 detects movement vectors of the blocks selected by the block selecting unit 36 (nine blocks in the present embodiment) based on the residual difference integral values E(x,y) in the ½ thinned images acquired by the residual difference acquiring unit 35 as explained in the second embodiment. The hand shake acquiring unit 37 detects the position of the template block T at which the residual difference becomes the minimum value in a search block I as the movement vector of the block including the search block I and template block.

Next, it defines the vector, among the detected nine movement vectors, having an x component and y component at predetermined place orders in the orders from the largest x component and y component (order from the smallest components also possible) as the movement vector of the entire image, that is, the amount of hand shake.

A concrete example of finding the amount of hand shake from movement vectors of selected blocks by the hand shake acquiring unit 37 will be explained next.

For example, a case of extracting a vector comprised of, as elements, a fifth placed x component and y component in the order from the largest x component and y component among the nine movement vectors will be explained.

Assume that the movement vectors of the selected nine blocks are (x1,y1), (x2,y2), (x3,y3), (x4,y4), (x5, y5), (x6, y6), (x7,y7), (x8,y8), and (x9,y9).

Assume that x8>x6>x4>x2>x9>x7>x5>x3>x1 stands when arranging the x components in the order from the largest one.

Assume that y9>y6>y3>y8>y5>y2>y7>y4>y1 stands when arranging the y components in the order from the largest one.

In this case, the fifth place order in the order from the largest x component is x9, and the fifth place order in the order from the largest y component is y5, therefore the movement vector (amount of hand shake) of the entire image acquired by the hand shake acquiring unit 37 becomes (x9,y5).

The hand shake detecting unit 3 detects the amount of hand shake by the method explained above.

As explained above, according to the imaging device 1 of the fourth embodiment, the hand shake acquiring unit 37 defines, as the amount of hand shake, the movement vector that has, as the x component and y component, the components located at a predetermined place order when arranging x components and y components of movement vectors of selected blocks in order from the largest component or in order from the smallest component, therefore hand shake can be detected with a higher precision.

Note that, in the fourth embodiment, the hand shake acquiring unit 37 extracted a vector that had, as the x component and y component, components located at a predetermined place order in order from the largest x component and y component (the order from the smallest components also possible) among the movement vectors of the predetermined number of blocks selected by the block selecting unit 36 and defined the extracted vector as the movement vector of the entire image, that is, the amount of hand shake, but as a modification of the present invention, the following configuration is also possible.

Namely, the hand shake acquiring unit 37 may define the vector at a predetermined place order in the order from the largest absolute value (the order from the smallest absolute value also possible), among the absolute values of movement vectors of the predetermined number of blocks selected by the block selecting unit 36, as the movement vector of the entire image, that is, the amount of hand shake.

Further, in the fourth embodiment, the residual difference acquiring unit 35 finds the residual difference integral values E(x,y) in a ½ thinned image for the predetermined number of blocks selected by the block selecting unit 36 in a search block I, and the hand shake acquiring unit 37 finds movement vectors of blocks selected based on the residual difference integral values E(x,y). However, in the present invention, it is also possible to omit this process. Namely, when the block selecting unit 36 selects the predetermined number of blocks having small residual differences, the hand shake acquiring unit 37 may detect the movement vectors of the selected blocks and obtain the vector that has, as the x component and y component, components located at a predetermined place order in the order from the largest x component and y component (the order from the smallest components also possible) among the predetermined number of movement vectors to thereby find the movement vector of the entire image, that is, the amount of hand shake (or define the movement vector at a predetermined place order in order from the largest (smallest) movement vector as the amount of hand shake). In this case, it is possible to further eliminate more computation than the fourth embodiment.

Note that, the detection method of the movement vector in this case is not limited in the present invention.

The present invention is not limited to the embodiments explained above.

Namely, persons skilled in the art could make various modifications, combinations, sub-combinations, and alterations to the constituent requirements of the embodiments explained above within the technical scope of the present invention or its equivalents.

Further, in the present embodiment, the residual difference comparing unit 34 obtains the difference between the maximum value and the minimum value of luminance values for each macro black during the period from when the block extracting unit 33 extracts a search block I and template block T to when the residual difference acquiring unit 35 acquires the residual difference integral values and, when this difference is smaller than the predetermined threshold value B, excludes that macro block from the scope of acquisition of the residual difference integral values by the residual difference acquiring unit 35, but the present invention is not limited to this. For example, the luminance difference comparing unit 34 may perform processing comparing the minimum values of residual difference integral values E(x,y) in all search blocks I, acquiring luminance differences immediately after extracting a predetermined number of small search blocks I having residual difference integral values having a small minimum value (that is between steps ST9 and ST10 in FIG.

5), and excluding any block having a luminance difference not more than the threshold value from the scope of acquisition of residual difference integral values.

Further, in the present embodiment, the data thinning unit 31 extracted only the Gr components and thinned the remaining components, but the present invention is not limited to this. For example, it is also possible to extract only other components or extract two types of components.

In the present embodiment, the hand shake detecting unit 3 further had, as configurations for the hand shake detection, the data thinning unit 31, macro block dividing unit 32, block extracting unit 33, luminance difference comparing unit 34, residual difference acquiring unit 35, block selecting unit 36, and hand shake acquiring unit 37. These parts of the hand shake detecting unit 3 may be assembled in the imaging device 1 as hardware for performing the processing or may be software for performing the processing under the control of the hand shake detecting unit 3.

Further, in the present embodiment, the hand shake detection processing was carried out for the raw data (data of RGB Beyer pattern) captured by the camera 2, but the present invention is not limited to this. Namely, for example, the hand shake detection processing can be carried out by using the luminance signal Y in a YUV format after the signal processing of the image as well.

Further, in the second and third embodiments, a coarse search and fine search were carried out by preparing ⅛ thinned images and ½ thinned images, but the thinning ratio is not limited in the present invention. For example, the coarse search may be carried out by 1/16 thinned images, and the fine search may be carried out in an image which is not thinned as well.

INDUSTRIAL APPLICABILITY

The invention can be utilized in a digital camera, a video camera, or other imaging device correcting hand shake.

The invention claimed is:

1. A shaking detection device performing matching processing and detecting an amount of shaking based on a standard image and a reference image differing in exposure conditions, comprising:
a macro block dividing unit configured to divide each of the standard image and reference image into a plurality of macro blocks,
a block extracting unit configured to extract a first block including one or more macro blocks each having a predetermined size from the standard image divided by the macro block dividing unit and extract a second block including one or more macro blocks each having a predetermined size from macro blocks of the reference image divided by the macro block dividing unit,
a residual difference acquiring unit configured to acquire residual differences between the first block and the second block extracted by the block extracting unit and acquire a residual difference integral value for each of the macro blocks based on the acquired residual differences,
a block selecting unit configured to select a predetermined number of macro blocks having small residual difference integral values acquired by the residual difference acquiring unit, and
a shaking acquiring unit configured to acquire residual differences again at the residual difference acquiring unit for the macro blocks selected by the block selecting unit and define, as the amount of shaking, a value at a predetermined place order when arranging the residual difference integral values in order from a largest value or from a smallest value.

2. A shaking detection device as set forth in claim 1, wherein:
the block extracting unit extracts a block having a predetermined size located at the center of an adjacent plurality of macro blocks based on the reference image and defines the same as the second block and extracts blocks of an amount of an adjacent plurality of macro blocks corresponding to the adjacent plurality of macro blocks of the reference image based on the standard image and defines the same as the first block.

3. A shaking detection device as set forth in claim 2, further comprising
a luminance difference comparing unit calculating a difference between a maximum value and a minimum value of luminance values for each macro block before the residual difference acquiring unit acquiring the residual differences and, when judging that the difference is smaller than a predetermined threshold value, excluding the macro block having that difference from the scope of acquisition of residual differences by the residual difference acquiring unit.

4. A shaking detection device as set forth in claim 2, further comprising:
a luminance difference comparing unit calculating a difference between a maximum value and a minimum value of luminance values after the block selecting unit selects the predetermined number of the macro blocks and, when judging that the difference is smaller than a predetermined threshold value, excluding the macro block having that difference from the scope of acquisition of residual differences by the residual difference acquiring unit.

5. A shaking detection device as set forth in any one of claims 1 to 4, wherein:
the device further comprises a data thinning unit extracting only predetermined components of raw data of the standard image and reference image and thinning the data to generate thinned images, and
the macro block dividing unit and the block extracting unit use the thinned images generated by the data thinning unit in place of the standard image and the reference image.

6. A shaking detection device as set forth in claim 5, wherein:
the residual difference acquiring unit finds the residual difference integral values by a coarse search using the thinned images to find the residual difference integral values,
the block selecting unit selects a predetermined number of macro blocks having small residual difference integral values found by the residual difference acquiring unit by the coarse search, and
the residual difference acquiring unit acquires residual difference integral values by a fine search, performed in more detail than the coarse search, using thinned out images having a thinning amount smaller than that of the above thinned out images or images which are not thinned to find the residual difference integral values for macro blocks selected by the block selecting unit.

7. A shaking detection device as set forth in claim 6, wherein:
when performing the fine search for macro blocks having small residual difference integral values selected by the block selecting unit at the time of the coarse search, the residual difference acquiring unit acquires residual differences only for pixels in the vicinity of the position where the minimum residual difference was acquired in the blocks at the time of the coarse search.

8. A shaking detection device as set forth in claim 7, wherein:

when acquiring residual differences of the first block and second block extracted by the block extracting unit, the residual difference acquiring unit does not acquire residual differences in the entire range, but acquires residual differences within only a predetermined range.

9. A shaking correction device performing matching processing and detecting an amount of shaking based on a standard image and reference image differing in exposure conditions and correcting the shaking based on the amount of shaking, comprising:

a macro block dividing unit configured to divide each of the standard image and reference image into a plurality of macro blocks, a block extracting unit configured to extract a first block including one or more macro blocks each having a predetermined size from the standard image divided by the macro block dividing unit and extract a second block including one or more macro blocks each having a predetermined size from macro blocks of the reference image divided by the macro block dividing unit, a residual difference acquiring unit configured to acquire residual differences between the first block and the second block extracted by the block extracting unit and acquire a residual difference integral value for each of the macro blocks based on the acquired residual differences, a block selecting unit configured to select a predetermined number of macro blocks having small residual difference integral values acquired by the residual difference acquiring unit, a shaking acquiring unit configured to acquire residual differences again at the residual difference acquiring unit for the macro blocks selected by the block selecting unit and define, as the amount of shaking, a value at a predetermined place order when arranging the residual difference integral values in an order from the largest value or from the smallest value, and an image mixing unit configured to mix the plurality of images based on the amount of shaking found by the shaking acquiring unit.

10. An imaging device capturing object images, wherein said device comprises a shaking detection device configured to perform matching processing and detect an amount of shaking based on a standard image and reference image differing in exposure conditions, the shaking detection device being a shaking detection device performing matching processing and detecting shaking correction of the imaging device based on the standard image and reference image differing in exposure conditions and having a macro block dividing unit configured to divide each of the standard image and reference image into a plurality of macro blocks, a block extracting unit configured to extract a first block including one or more macro blocks each having a predetermined size from the standard image divided by the macro block dividing unit and extract a second block including one or more macro blocks each having a predetermined size from macro blocks of the reference image divided by the macro block dividing unit, a residual difference acquiring unit configured to acquire residual differences between the first block and the second block extracted by the block extracting unit and acquire a residual difference integral value for each of the macro blocks based on the acquired residual differences, a block selecting unit configured to select a predetermined number of macro blocks having small residual difference integral values acquired by the residual difference acquiring unit, and a shaking acquiring unit configured to acquire residual differences again at the residual difference acquiring unit for the macro blocks selected by the block selecting unit and define, as the amount of shaking, a value at a predetermined place order when arranging residual difference integral values in order from the largest value or from the smallest value.

11. A shaking detection method for performing matching processing and detecting an amount of shaking based on a standard image and a reference image differing in exposure conditions, including:

a first step of dividing each of the standard image and reference image into a plurality of macro blocks, a second step of extracting a first block including one or more macro blocks each having a predetermined size from the standard image divided at the first step and extracting a second block including one or more macro blocks each having a predetermined size from macro blocks of the reference image divided at the first step, a third step of acquiring a residual difference between the first block and the second block extracted in the second step and acquiring a residual difference integral value for each of the macro blocks based on the acquired residual differences, a fourth step of selecting a predetermined number of macro blocks having small residual difference integral values acquired at the third step, and a fifth step of acquiring residual differences again for the macro blocks selected at the fourth step and defining, as the amount of shaking, a value at a predetermined place order when arranging residual difference integral values in order from the largest value or from the smallest value.

* * * * *